US011205069B1

(12) United States Patent
Sharma et al.

(10) Patent No.: US 11,205,069 B1
(45) Date of Patent: Dec. 21, 2021

(54) HYBRID CORNEA AND PUPIL TRACKING

(71) Applicant: Facebook Technologies, LLC, Menlo Park, CA (US)

(72) Inventors: Robin Sharma, Redmond, WA (US); Javier San Agustin Lopez, Menlo Park, CA (US); Karol Constantine Hatzilias, Kenmore, WA (US); Sebastian Sztuk, Menlo Park, CA (US); Kun Liu, Mountain View, CA (US); Jixu Chen, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/796,615

(22) Filed: Feb. 20, 2020

(51) Int. Cl.
| | |
|---|---|
| *G06K 9/00* | (2006.01) |
| *G02B 27/00* | (2006.01) |
| *G06K 9/20* | (2006.01) |
| *G06F 3/01* | (2006.01) |

(52) U.S. Cl.
CPC ..... *G06K 9/00604* (2013.01); *G02B 27/0093* (2013.01); *G06F 3/013* (2013.01); *G06K 9/2018* (2013.01); *G06K 9/2027* (2013.01)

(58) Field of Classification Search
CPC .............. G06K 9/00604; G06K 9/2027; G06K 9/2018; G06F 3/013; G02B 27/0093
See application file for complete search history.

(56) References Cited

U.S. PATENT DOCUMENTS

| 5,815,741 | A | 9/1998 | Okuyama et al. | |
|---|---|---|---|---|
| 10,268,268 | B1 | 4/2019 | Trail | |
| 10,274,730 | B2 | 4/2019 | Jepsen et al. | |
| 2011/0211056 | A1* | 9/2011 | Publicover | H04N 5/2354 |
| | | | | 348/78 |
| 2014/0111632 | A1* | 4/2014 | Huang | G06F 3/013 |
| | | | | 348/78 |
| 2016/0103484 | A1* | 4/2016 | Guo | G06K 9/0061 |
| | | | | 345/156 |
| 2016/0328016 | A1* | 11/2016 | Andersson | H04N 5/2256 |
| 2017/0115483 | A1* | 4/2017 | Aleem | G02B 27/0093 |
| 2018/0070819 | A1 | 3/2018 | Kanamori et al. | |
| 2018/0314325 | A1* | 11/2018 | Gibson | G02B 27/017 |
| 2019/0019023 | A1 | 1/2019 | Konttori et al. | |
| 2019/0046031 | A1 | 2/2019 | Kramer et al. | |
| 2019/0101767 | A1 | 4/2019 | Geng et al. | |

(Continued)

FOREIGN PATENT DOCUMENTS

| EP | 3079560 A1 | 10/2016 |
|---|---|---|
| WO | 2016162822 A1 | 10/2016 |

OTHER PUBLICATIONS

Wang, Hongyi et al., On-chip sensor for light direction detection, Nov. 15, 2013, 4, Optics Letters, vol. 38, No. 22.

(Continued)

*Primary Examiner* — Francis Geroleo
(74) *Attorney, Agent, or Firm* — Freestone Intellectual Property Law PLLC; Aaron J. Visbeek

(57) ABSTRACT

A hybrid cornea and pupil eye-tracking technique includes receiving iris-backscattered light from an eye and determining a pupil-position of the eye based on the iris-backscattered light. Cornea-reflected light is received from the eye and an eye-tracking position of the eye is determined based on the cornea-reflected light and the pupil-position.

13 Claims, 13 Drawing Sheets

(56) References Cited

U.S. PATENT DOCUMENTS

2019/0282089 A1 9/2019 Wang
2019/0361250 A1 11/2019 Lanman et al.
2020/0372678 A1* 11/2020 Farmer ................... G06F 3/013

OTHER PUBLICATIONS

International Searching Authority, Patent Cooperation Treaty, Written Opinion of the International Searching Authority, European Application No. PCT/US2020/063513, dated Feb. 18, 2021, 9 pages.
International Searching Authority, Patent Cooperation Treaty, European Application No. PCT/US2021/014970, dated Apr. 15, 2021, 3 pages.
International Searching Authority, Patent Cooperation Treaty, Written Opinion of the International Searching Authority, European Application No. PCT/US2021/014970, dated Apr. 15, 2021, 5 pages.
International Searching Authority, Patent Cooperation Treaty, Written Opinion of the International Searching Authority, European Application No. PCT/US2021/014693, dated Mar. 12, 2021, 12 pages.

* cited by examiner

US 11,205,069 B1

HYBRID CORNEA AND PUPIL TRACKING

BACKGROUND INFORMATION

A variety of techniques for eye-tracking have been developed for head mounted devices such as a head mounted display. Some eye-tracking techniques include capturing images of the eye and performing image processing on the images in order to determine a position of the eye. A reduction of electrical power and/or a reduction of processing power associated with eye-tracking techniques is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
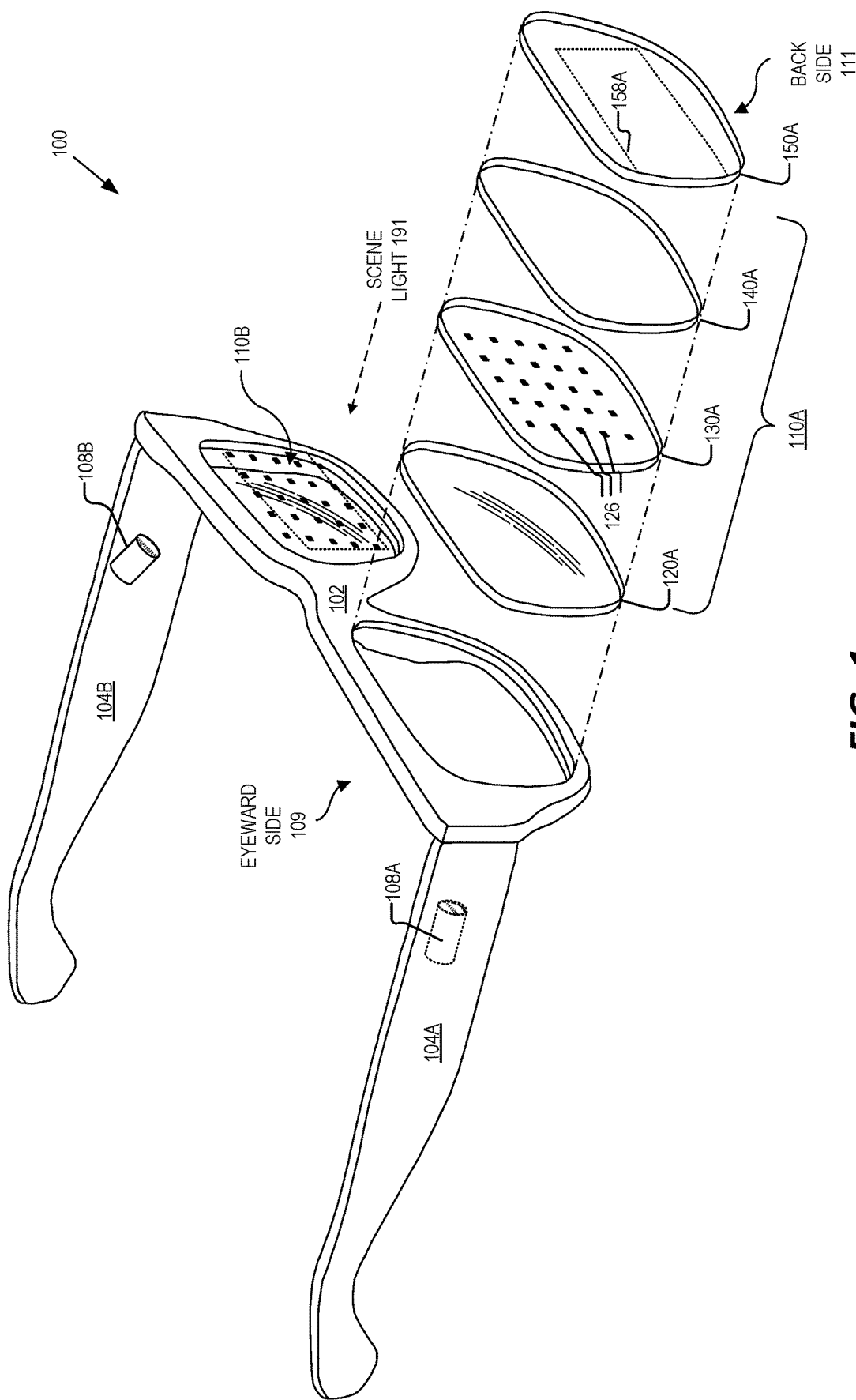
FIG. 1 illustrates an example head mounted display (HMD), in accordance with aspects of the disclosure.

Embodiments of hybrid cornea and pupil tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of hybrid cornea and pupil tracking described in this disclosure may reduce the electrical power and/or processing power in an eye-tracking system or method. One eye-tracking technique includes illuminating an eye region with non-visible light (e.g. near-infrared light) and then capturing tracking images of the eye while the eye is illuminated. Image processing that identifies the pupil-position of the eye is then performed on the image and the pupil-position can be used as a proxy for eye position. Yet, generating tracking images that have enough signal-to-noise (SNR) for identifying the contrast between an iris of the eye and the pupil requires driving illuminators (e.g. infrared light emitting diodes) at relatively high power. In particular, the backscattering (and light absorbing) properties of the iris may necessitate increased illumination to capture images with enough contrast to identify the difference between the iris and the pupil.

In embodiments of the disclosure, a hybrid cornea and pupil tracking technique including illuminating the eye with a lower intensity of non-visible illumination light to capture images with cornea glints and a higher intensity of non-visible illumination light to capture images having sufficient contrast to determine a pupil-position of the eye. After capturing a first eye-tracking image that includes a pupil (while the eye is illuminated at the higher intensity of non-visible illumination light), the non-visible illumination light may be dropped to a lower intensity to capture second eye-tracking images that capture cornea glints but may lack sufficient contrast to determine pupil-position of the eye. A gaze direction of the eye may then be determined based on a cornea-position (derived from the second eye-tracking image captured at the lower intensity) and the first eye-tracking position. By capturing at least some eye-tracking images at the lower intensity of non-visible illumination light, electrical power and/or processing power may be saved. These and other embodiments are described in more detail in connection with FIGS. 1-9B.

FIG. 1 illustrates an example HMD 100, in accordance with aspects of the present disclosure. The illustrated example of HMD 100 is shown as including a frame 102, temple arms 104A and 104B, and near-eye optical elements 110A and 110B. Cameras 108A and 108B are shown as coupled to temple arms 104A and 104B, respectively. FIG. 1 also illustrates an exploded view of an example of near-eye optical element 110A. Near-eye optical element 110A is shown as including an optically transparent layer 120A, an illumination layer 130A, an optical combiner layer 140A, and a display layer 150A. Display layer 150A may include a waveguide 158 that is configured to direct virtual images to an eye of a user of HMD 100.

Illumination layer 130A is shown as including a plurality of in-field illuminators 126. In-field illuminators 126 are described as "in-field" because they are in a field of view (FOV) of a user of the HMD 100. In-field illuminators 126 may be in a same FOV that a user views a display of the HMD, in an embodiment. In-field illuminators 126 may be in a same FOV that a user views an external environment of the HMD 100 via scene light 191 propagating through near-eye optical elements 110. While in-field illuminators 126 may introduce minor occlusions into the near-eye optical element 110A, the in-field illuminators 126, as well as their corresponding electrical routing may be so small as to be unnoticeable or insignificant to a wearer of HMD 100. Additionally, any occlusion from in-field illuminators 126 will be placed so close to the eye as to be unfocusable by the human eye and therefore assist in the in-field illuminators 126 being not noticeable or insignificant. In some embodiments, each in-field illuminator 126 has a footprint (or size) that is less than about 200×200 microns. When HMD 100 is being worn by a user, the in-field illuminators 126 may be disposed between 10 mm and 30 mm from the eye. In some embodiments, the in-field illuminators 126 may be placed between 15 mm and 25 mm from the eye of a user. The in-field illuminators 126 may be non-visible in-field illuminators 126 configured to emit non-visible illumination light for eye-tracking purposes, for example. In a particular implementation, in-field illuminators 126 are near-infrared in-field illuminators 126 configured to emit near-infrared illumination light for eye-tracking purposes, for example.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light from the environment while also receiving display light directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of in-field illuminators 126. Each in-field illuminator 126 may be disposed on a transparent substrate and may be configured to emit light towards an eyeward side 109 of the near-eye optical element 110A. In some aspects of the disclosure, the in-field illuminators 126 are configured to emit near-infrared light (e.g. 750 nm-1.5 µm). Each in-field illuminator 126 may be a micro light emitting diode (micro-LED), an edge emitting LED, a vertical cavity surface emitting laser (VCSEL) diode, or a Superluminescent diode (SLED).

As mentioned above, the in-field illuminators 126 of the illumination layer 130A may be configured to emit non-visible illumination light towards the eyeward side 109 of the near-eye optical element 110A to illuminate the eye of a user. The near-eye optical element 110A is shown as including optical combiner layer 140A where the optical combiner 140A is disposed between the illumination layer 130A and a backside 111 of the near-eye optical element 110A. In some aspects, the optical combiner 140A is configured to receive non-visible light that has been reflected or backscattered by the eye of the user. Optical combiner 140A is configured to redirect the reflected or backscattered non-visible light towards the camera 108A. The camera 108 may be located in different positions than the positions illustrated. In some embodiments, cameras 108 may be configured to image the eye directly without relying on a combiner element to redirect reflected/backscattered non-visible light to the camera. In some aspects, the optical combiner 140A is transmissive to visible light, such as scene light 191 incident on the backside 111 of the near-eye optical element 110A. In some examples, the optical combiner 140A may be configured as a volume hologram and/or may include one or more Bragg gratings for directing non-visible light towards camera 108A. In some examples, the optical combiner 140A includes a polarization-selective volume hologram (a.k.a. polarized volume hologram) that diffracts (in reflection) a particular polarization orientation of incident light while passing other polarization orientations.

Display layer 150A may include one or more other optical elements depending on the design of the HMD 100. For example, display layer 150A may include a waveguide 158 to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the non-visible illumination light emitted by the illumination layer 130A and pass the non-visible illumination light to illuminate the eye of the user. As mentioned above, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A may, in some examples, be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

Figure 2:
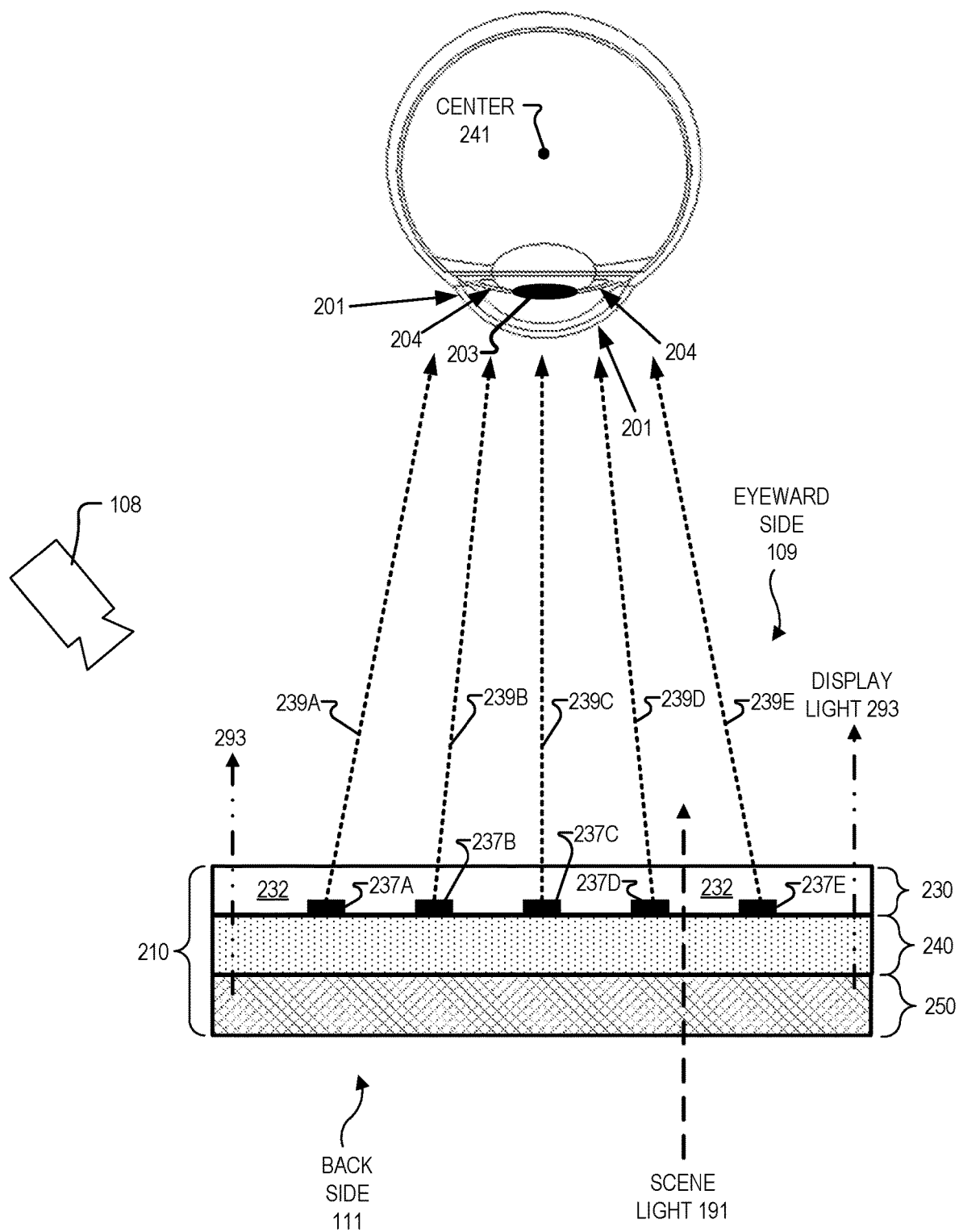
FIG. 2 is a top view of an example near-eye optical element that includes an illumination layer, a combiner layer, and a display layer, in accordance with aspects of the disclosure.

FIG. 2 is a top view of an example near-eye optical element 210 that includes an illumination layer 230, a combiner layer 240, and a display layer 250, in accordance with aspects of the disclosure. A transparent layer (not illustrated) may optionally be included between illumination layer 230 and eye 202, in some embodiments. A plurality of in-field illuminators 237A-237E emits non-visible illumination light 239A-E to an eyebox area to illuminate eye 202. A pupil 203 of eye 202 is illustrated as well as a center-of-rotation 241 of eye 202. The center-of-rotation 241 of eye 202 may be determined or approximated from the shape of cornea 201.

As described above, in-field illuminators 237 may be VCSELs or SLEDs, and consequently non-visible illumination light 239 may be narrow-band illumination light (e.g. linewidth of 1-10 nm). The non-visible illumination light 239 may be collimated or near-collimated. As will be described in greater detail below, the illumination light that is backscattered or reflected from eye 202 may be received by optical combiner element 240 and redirected to camera 108 to generate an image.

Camera 108A is configured to capture eye-tracking images that may be utilized to determine an eye-position and/or gaze direction of eye 202, for example. Camera 108 may include a bandpass filter to pass the wavelength of the non-visible illumination light 239 emitted by illuminators 237 and block other light from becoming incident on an image sensor of camera 108, in some embodiments.

FIG. 2 shows that scene light 191 (visible light) from the external environment may propagate through display layer 250, combiner layer 240, and illumination layer 230 to become incident on eye 202 so that a user can view the scene of an external environment. FIG. 2 also shows that display layer 250 may generate or redirect display light 293 to present virtual images to eye 202. Display light 293 is visible light and propagates through combiner layer 240 and illumination layer 230 to reach eye 202.

Illumination layer 230 may include a transparent substrate that the in-field illuminators 237 are disposed on. The in-field illuminators 237 may also be encapsulated in a transparent material 232. Transparent material 232 is configured to transmit visible light (e.g. 400 nm-700 nm) and near-infrared light (e.g. 700 nm-1.5 μm).

Figure 3:
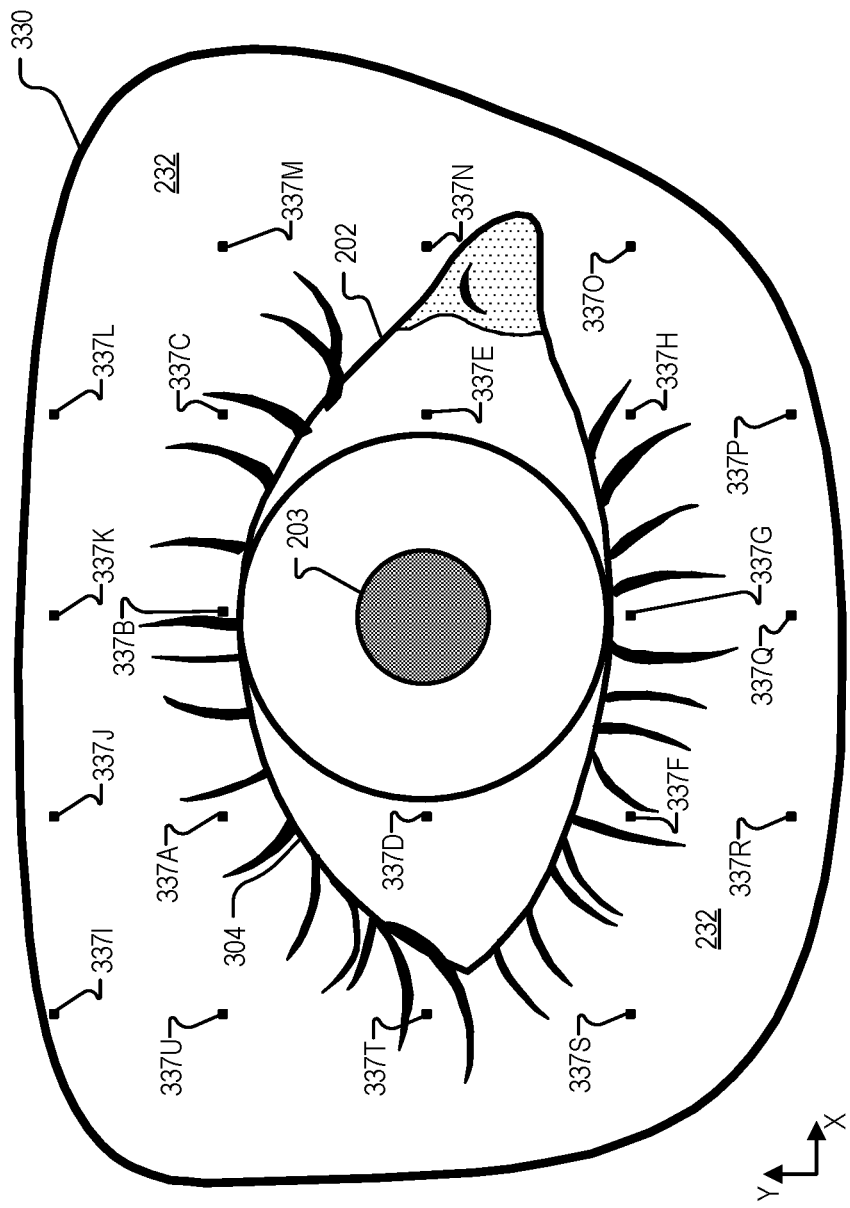
FIG. 3 illustrates a front view of an eye through an example illumination layer, in accordance with aspects of the disclosure.

FIG. 3 illustrates a front view of eye 202 through an example illumination layer 330, in accordance with aspects of the disclosure. In the illustrated embodiment, illumination layer 330 include twenty-one infrared in-field illuminators (337A-337U). In the illustrated example, infrared illuminators 337A-337H may be considered an "inner ring" of infrared in-field illuminators 337 while infrared illuminators 337I-337U are considered an "outer ring" of infrared in-field illuminators 337. As such, infrared illuminators 337I-337U may direct their infrared illumination light to eye 202 at a steeper angle than infrared illuminators 337A-337H in the inner ring.

Figure 4A:
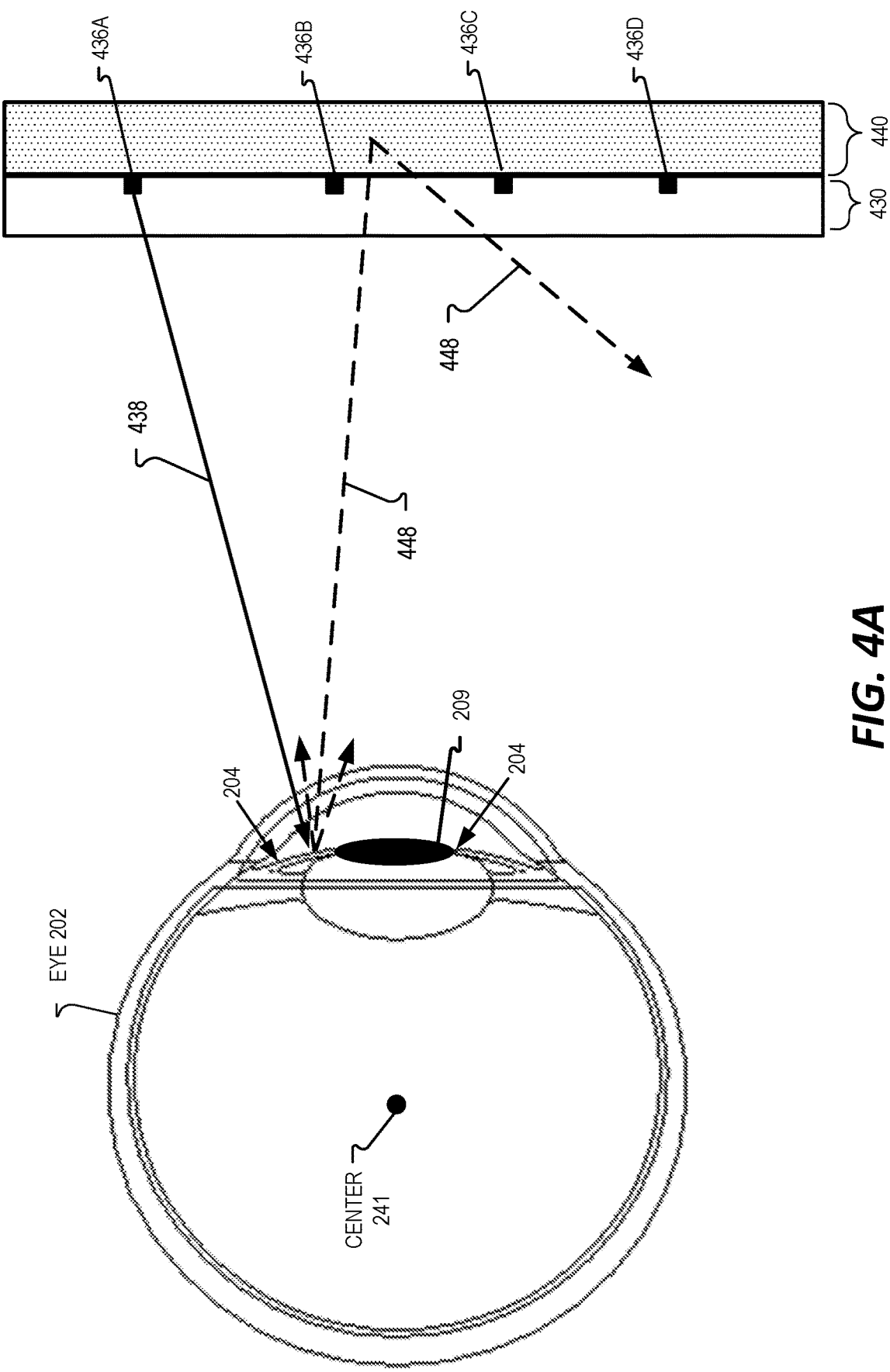
FIG. 4A illustrates an example optical path of non-visible illumination light and iris-backscattered light, in accordance with aspects of the disclosure.

FIG. 4A illustrates an example optical path of non-visible illumination light 438 and iris-backscattered light 448, in accordance with aspects of the disclosure. In FIG. 4A, an array of illuminators 436 emits non-visible illumination light 438 toward eye 202. The non-visible illumination light 438 may be near-infrared light. Only the illumination light 438 from in-field illuminator 436A is shown for illustration and description of the optical path of the non-visible illumination light, in FIG. 4A. A portion of non-visible illumination light 438 encounters iris 204 and is backscattered as iris-backscattered light 448. At least a portion of iris-backscattered light 448 propagates through illumination layer 430 and encounters combiner optical element 440. Of course, iris-backscattered light 448 is of the same wavelength as non-visible illumination light 438.

Combiner optical element 440 receives iris-backscattered light 448 and redirects the iris-backscattered light 448 to a camera (e.g. camera 108). Combiner optical element 440 may include a polarization-selective volume hologram that reflects a first polarization orientation (e.g. right-hand circularly polarized light) of the iris-backscattered light 448 and passes polarization orientations that are other than the first polarization orientation. Combiner optical element 440 may also include a folding mirror, hologram or linear diffractive grating, to redirect iris-backscattered light 448, in some embodiments. The combiner optical element 440 transmits visible light.

Figure 4C:
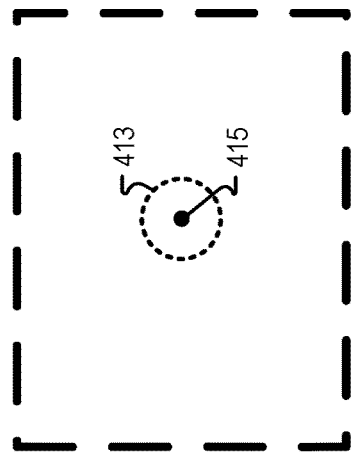
FIGS. 4B-4E illustrate example eye-tracking images and pupil-positions of an eye, in accordance with aspects of the disclosure.
Figure 4E:
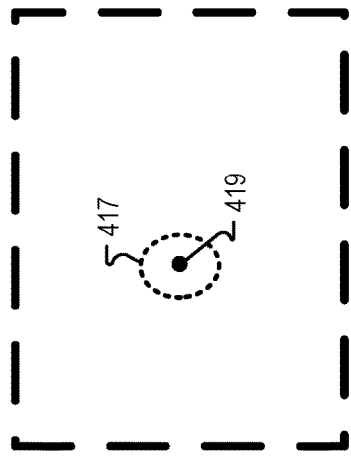
Figure 4B:
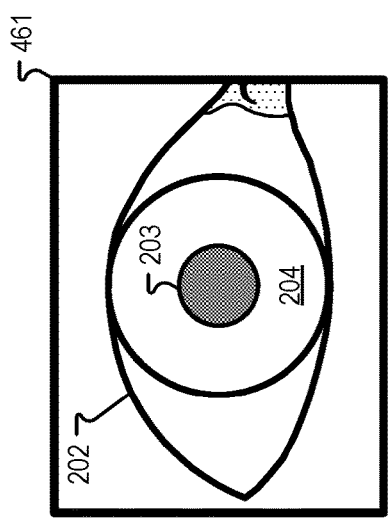
Figure 4D:
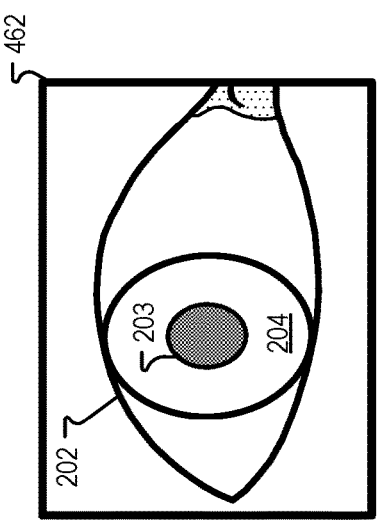

FIGS. 4B-4E illustrate example eye-tracking images and pupil-positions of an eye 202, in accordance with aspects of the disclosure. FIGS. 4B and 4D illustrate eye-tracking images 461 and 462 that include a pupil 203 and an iris 204 of eye 202. FIG. 4B shows eye 202 gazing in a forward direction and FIG. 4D shows eye 202 gazing in a temple direction (opposite a nasal direction). FIG. 4C illustrates that eye-tracking image 461 has sufficient contrast between the iris 204 and the pupil 203 to determine a pupil-position 413 of eye 202. Cornea glints (not illustrated) from non-visible illumination light 438 reflecting off of a cornea of eye 202 may also be present in eye-tracking images 461 and 462. Using known image processing techniques, a pupil-center 415 can be determined from pupil-position 413 by determining the middle of pupil-position 413. FIG. 4E illustrates that eye-tracking image 462 has sufficient contrast between the iris 204 and the pupil 203 to determine a pupil-position 417 of eye 202. Using known image processing techniques, a pupil-center 419 can be determined from pupil-position 417 by determining the middle of pupil-position 417. Notably, pupil-position 417 in FIG. 4E is farther in a temple direction than pupil-position 413, in FIG. 4C.

Figure 5A:
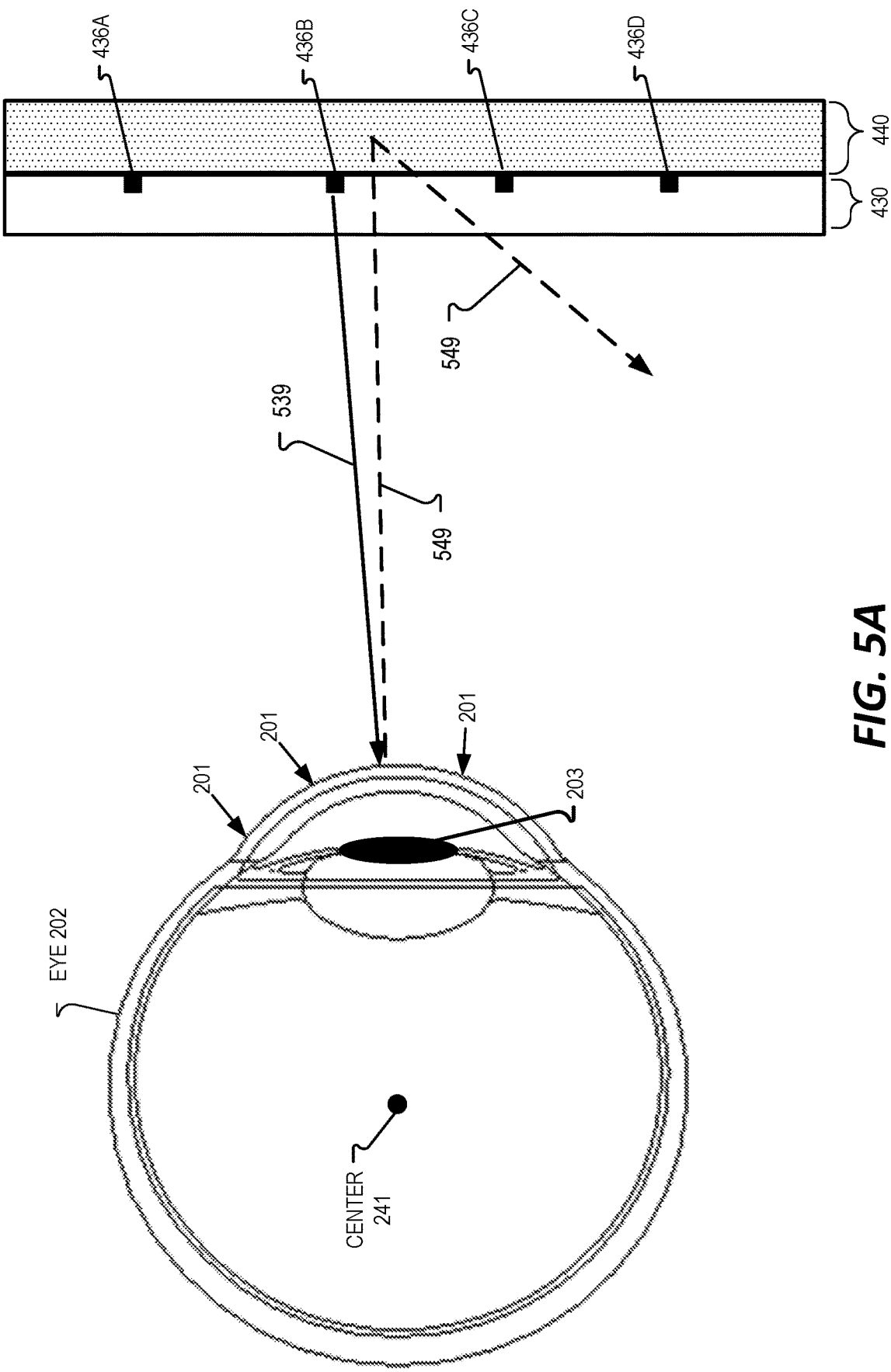
FIG. 5A illustrates an example optical path of non-visible illumination light and cornea-reflected light, in accordance with aspects of the disclosure.

FIG. 5A illustrates an example optical path of non-visible illumination light 539 and cornea-reflected light 549, in accordance with aspects of the disclosure. In FIG. 5A, an array of illuminators 436 emits non-visible illumination light 539 toward eye 202. The non-visible illumination light 539 may be near-infrared light. Only the illumination light 539 from in-field illuminator 436B is shown for illustration and description of the optical path of the non-visible illumination light, in FIG. 5A. At least a portion of non-visible illumination light 539 encounters cornea 201 and is reflected as cornea-reflected light 549. At least a portion of cornea-reflected light 549 propagates through illumination layer 430 and encounters combiner optical element 440. Of course, cornea-reflected light 549 is of the same wavelength as non-visible illumination light 539.

Combiner optical element 440 receives cornea-reflected light 549 and redirects the cornea-reflected light 549 to a camera (e.g. camera 108). Combiner optical element 440 may include a polarization-selective volume hologram that reflects a first polarization orientation (e.g. right-hand circularly polarized light) of the cornea-reflected light 549 and passes polarization orientations that are other than the first polarization orientation. Combiner optical element 440 may also include a folding mirror, hologram or linear diffractive grating, to redirect cornea-reflected light 549, in some embodiments.

Figure 5C:
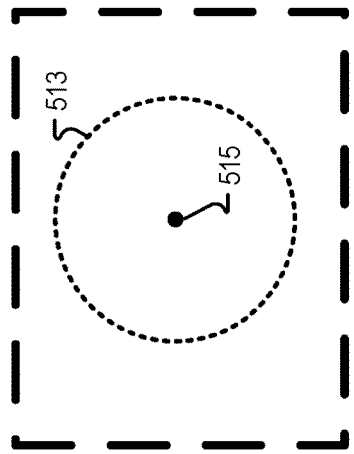
FIGS. 5B-5E illustrate example eye-tracking images and cornea-positions of an eye, in accordance with aspects of the disclosure.
Figure 5E:
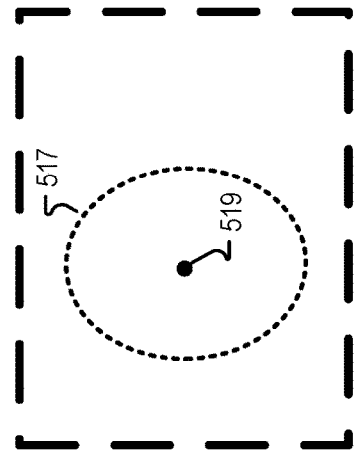
Figure 5B:
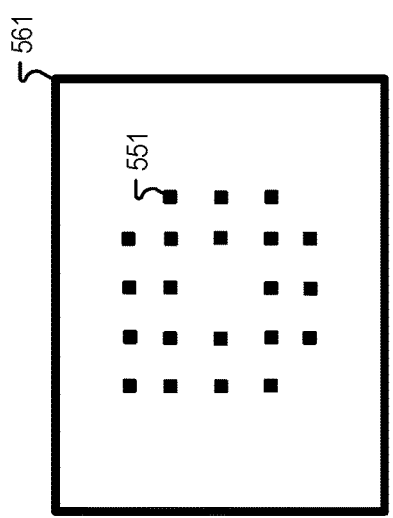
Figure 5D:
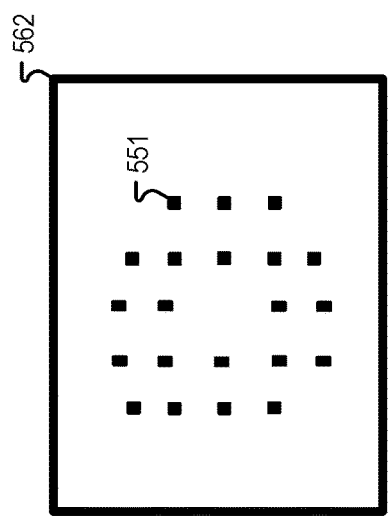

FIGS. 5B-5E illustrate example eye-tracking images and cornea-positions of an eye 202, in accordance with aspects of the disclosure. FIGS. 5B and 5D illustrate eye-tracking images 561 and 562 that include cornea glints 551 of eye 202. There may be one cornea glint 551 for each illuminator 436 in the array of illuminators, for example. Cornea glints 551 are from non-visible illumination light 539 reflecting from cornea 201 of eye 202. FIGS. 5B and 5D may not have sufficient contrast between the pupil and the iris to determine a pupil-position of eye 202. However, non-visible illumination light 539 may have a lower intensity than a higher intensity of non-visible illumination light 438 that would be required to illuminate eye 202 to have sufficient contrast between pupil 203 and iris 204 to determine a pupil-position of eye 202.

FIG. 5B shows cornea glints 551 of eye 202 when eye 202 is gazing in a forward direction and FIG. 5D shows cornea glints 551 of eye 202 gazing in a temple direction (opposite a nasal direction). The shape of cornea glints 551 and the spacing between cornea glints 551 has changed from FIG. 5B to FIG. 5D due to eye 202 gazing in a different direction. FIG. 5C illustrates that a cornea-position 513 can be determined from eye-tracking image 561 by analyzing the shape of cornea glints 551 and/or the distance between particular cornea glints 551, for example. A cornea-center 515 can be determined from cornea-position 513 by determining the middle of cornea-position 513. FIG. 5E illustrates that a cornea-position 517 can be determined from eye-tracking image 562 by analyzing the shape of cornea glints 551 and/or the distance between particular cornea glints 551. A cornea-center 519 can be determined from cornea-position 517 by determining the middle of cornea-position 517. Notably, cornea-position 517 in FIG. 5E is farther in a temple direction than cornea-position 513, in FIG. 5C. Determining a cornea-position 513/517 may allow for determining a center-of-rotation 241 of eye 202 based on a curvature of cornea 201 relative to a spherical model of eye 202.

Figure 6A:
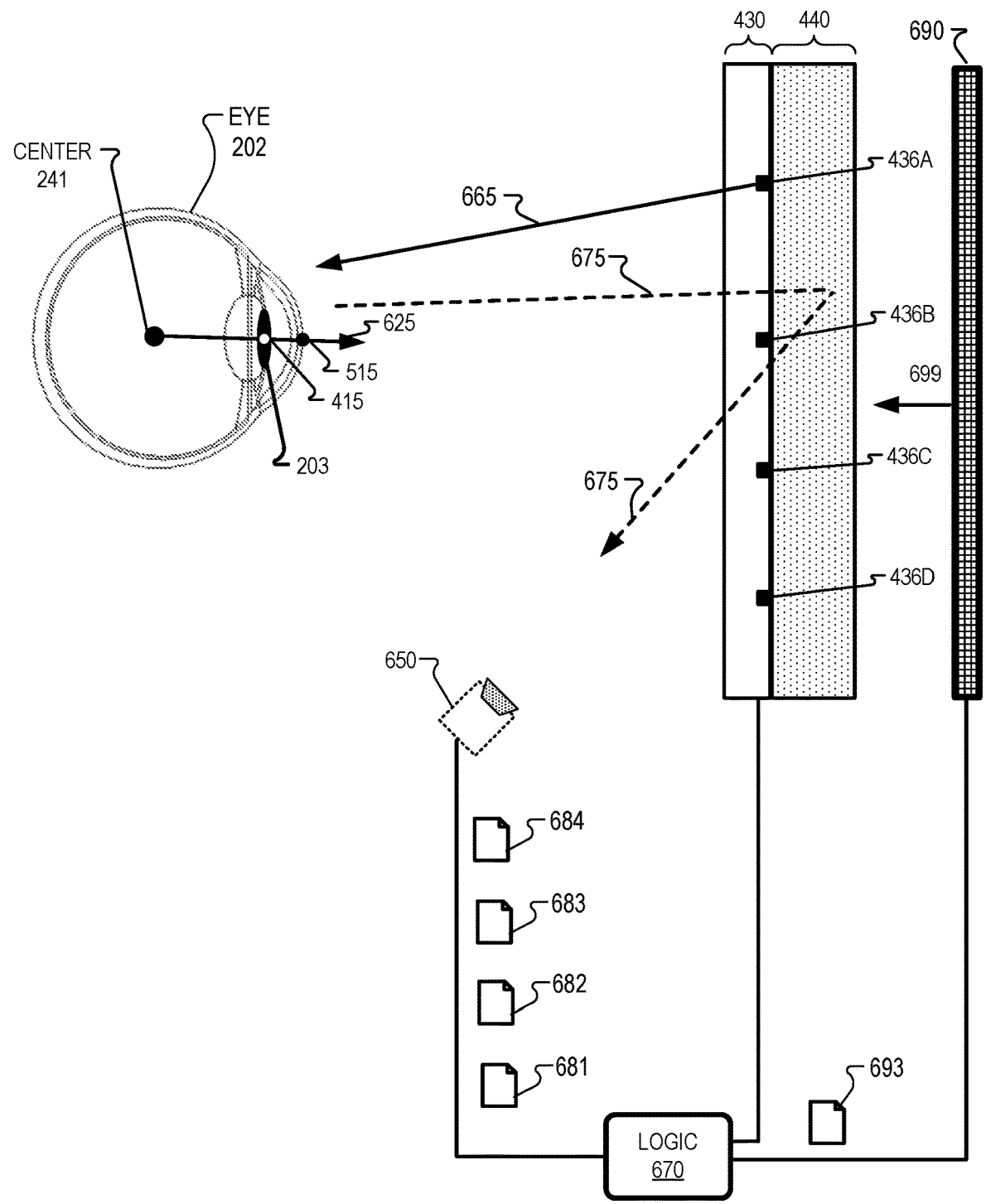
FIGS. 6A-6B illustrate a near-eye optical system for performing a hybrid cornea and pupil tracking technique, in accordance with aspects of the disclosure.
Figure 6B:
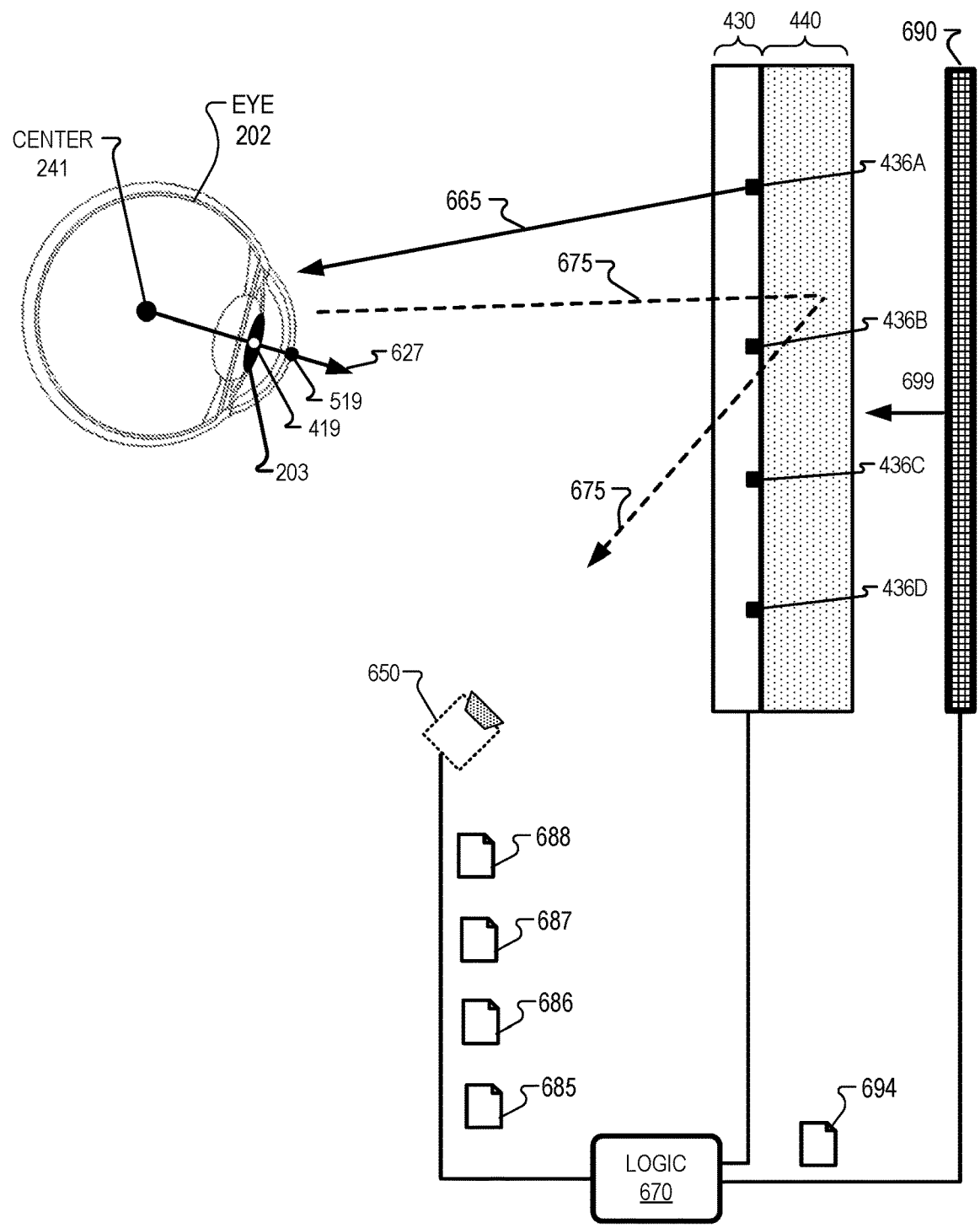

Capturing an eye-tracking image including sufficient contrast between pupil 203 and iris 204 generally requires a large increase in the illumination intensity of non-visible illumination light 438 since iris-backscattered light 448 may only represent less than 1% of non-visible illumination light 438 that is backscattered by iris 204. In contrast, greater than 1% of the non-visible illumination light may reflect from cornea 201 as glints 551. Consequently, pupil tracking may require more electrical power to drive illuminators 436 to emit a higher intensity of non-visible illumination to provide sufficient illumination to attain a signal-to-noise ratio in an eye-tracking image (e.g. 461/462) to resolve a pupil 203 from the iris 204. In an example, the intensity of the non-visible illumination light (emitted by illuminators 436) required for pupil tracking is ten times greater than the intensity of the non-visible illumination light to determine a cornea-position of the eye. Yet, there may be an advantage to start an eye-tracking technique with a pupil-position (determined from eye-tracking images captured with eye 202 being illuminated at a higher intensity of the non-visible illumination light) and then proceeding with eye-tracking using cornea-positions (determined from eye-tracking images captured with eye 202 being illuminated at a lower intensity of the non-visible illumination light). By way of example, electrical power can be saved by driving illuminators 436 to emit the non-visible illumination light at lower intensities for at least a portion of an eye-tracking process. In some embodiments, image processing computation is also reduced for generating cornea-positions rather than pupil-positions because glints 551 may be more easily identified in image processing than determining pupil 203 based on iris 204. FIGS. 6A-6B illustrate a near-eye optical system 600 for performing a hybrid cornea and pupil tracking technique, in accordance with aspects of the disclosure. In some examples, near-eye optical system 600 may determine a gaze direction of eye 202 based at least in part on eye-tracking images captured by near-eye optical system 600. Example near-eye optical system 600 includes a camera 650, processing logic 670, illumination layer 430, combiner optical element 440, and display layer 690.

Display 690 generates visible display light 699 for presenting a virtual image to a user of an HMD. Visible display light 699 may propagate through a near-eye optical element that includes illumination layer 430 and combiner optical element 440 with very little (if any) optical loss since the materials in the near-eye optical element are configured to pass visible light and combiner optical element 440 may be configured to diffract or reflect a particular wavelength of light (e.g. near-infrared) emitted by illuminators 436. Display 690 may include an OLED, micro-LED, or LCD in a virtual reality context. In an augmented reality or mixed reality context, display 690 may include a transparent OLED or an LCOS projector paired with a waveguide included in a near-eye optical element of an HMD, for example.

In FIG. 6A, processing logic 670 is configured to control display 690 and drive images onto display 690. Processing logic 670 is also configured to receive eye-tracking images 681, 682, 683, and 684 captured by camera 650. Processing logic 670 may drive different images 693 onto display layer 690 based at least in part on eye-tracking images received by processing logic 670. Processing logic 670 is also configured to modulate an intensity of non-visible illumination light 665 emitted by the illuminators in the array of illuminators 436 in illumination layer 430.

Camera 650 may include a bandpass filter to pass the wavelength of the non-visible illumination light 665 emitted by illuminators 436 and block other light from becoming incident on an image sensor of camera 650, in some embodiments. Camera 650 may include a complementary metal-oxide semiconductor (CMOS) image sensor. An infrared filter that passes a narrow-band near-infrared wavelength of non-visible illumination light 665 may be placed over the image sensor so it is sensitive to a narrow-band near-infrared wavelength while rejecting visible light and wavelengths outside the narrow-band, in some embodiments.

In operation, near-eye optical system 600 is configured to drive illuminators 436 to illuminate eye 202 with non-visible light 665, which may be infrared light. The non-visible light 665 has a first intensity. Processing logic 670 may drive illuminators 436 to emit the first intensity of non-visible light 665, for example. While the non-visible light 665 at the first intensity is illuminating eye 202, camera 650 captures a first eye-tracking image (e.g. eye-tracking image 681) that includes a pupil 203 of eye 202. In other words, the eye-tracking image 681 has sufficient contrast to determine a difference between iris 204 and pupil 203 by way of image processing.

Subsequent to capturing the first eye-tracking image, near-eye optical system 600 is configured to drive illuminators 436 to illuminate eye 202 with non-visible light 665 having a second intensity that is less than the first intensity. Processing logic 670 may drive illuminators 436 to emit the second intensity of non-visible light 665, for example. While non-visible light 665 is illuminating eye 202 at the second intensity that is less than the first intensity, camera 650 captures a second eye-tracking image (e.g. eye-tracking image 682) that includes cornea glints (e.g. cornea glints 551). A cornea-position of eye 202 is determined based on the second eye-tracking image. In the specific example of FIG. 6A, processing logic 670 may receive the second eye-tracking image and determine a cornea-position of eye 202 based on the second eye-tracking image. A third eye-tracking image (e.g. eye-tracking image 683) and a fourth eye-tracking image (e.g. eye-tracking image 684) may also be captured while illuminators emit non-visible illumination light 665 at the second intensity that is lower than the first intensity. The second eye-tracking image 682, the third eye-tracking image 683, and the fourth eye-tracking image 684 may not have the contrast sufficient to determine a pupil-position of eye 202, but a cornea-position may be determined from cornea glints included in the eye-tracking images.

In some implementations, for each eye-tracking image captured at the higher first intensity of the non-visible light (sufficient for pupil tracking), ten or more eye-tracking images are captured at the lower second intensity of the non-visible light (illumination intensity not sufficient to determine pupil) where those eye-tracking images can still determine cornea glints. In other implementations, the ratio is 30:1 or greater of low-illumination eye-tracking images (sufficient to determine cornea glints but may not sufficient to determine pupil positions) to high-illumination eye-tracking images (sufficient contrast to determine pupil-position of eye) such as eye-tracking image 681. In other implementations, the ratio may be 60:1 or greater. In some implementations, a high-illumination eye-tracking images (e.g. eye-tracking image 681) is captured immediately after a large eye movement (e.g. a saccade) is detected. In some implementations, a high-illumination eye-tracking images (e.g. eye-tracking image 681) is captured immediately after when an error regarding the eye-position is detected or a misalignment in an active re-calibration algorithm is detected.

A gaze direction 625 of eye 202 may be determined based at least in part on eye-tracking images captured by system 600. In an embodiment, a gaze direction 625 of eye 202 is determined based at least in part on a pupil-center coordinate such as pupil-center 415. The gaze direction 625 of eye 202 may be determined based on the pupil-center coordinate and user calibration data, in some embodiments. User calibration data may be calibration in a calibration routine where a user is directed to look at particular pixels of a two-dimensional pixel array of display layer 690. While the user is looking at those particular pixels (illuminated in white while all other pixels are black, for example), an eye-tracking image is captured and a pupil-center of the eye-tracking image is determined. In this way, a pupil-position and/or a pupil-center of the pupil is linked to a particular x-y pixel coordinate on display layer 690 so that future gaze directions 625 can be determined based on future pupil-positions or pupil-center coordinates derived from the pupil-positions.

In addition to determining gaze direction 625 from a pupil-position, a gaze direction 625 may also be determined based at least in part on a cornea-position where a cornea-center such as cornea-center 515 is determined by calculating or approximating an $x_c$, $y_c$, and $z_c$ center of a sphere of the cornea. The cornea glints 551 from eye-tracking images 682, 683, and/or 684 provide the data to determine the cornea position and corresponding cornea-center, for example.

In a hybrid cornea and pupil tracking, a first eye-tracking image (e.g. image 681) may be captured while the non-visible illumination light 665 is at a first intensity and a second eye-tracking image (e.g. image 682) may be captured while the non-visible illumination light 665 is at a second intensity. The gaze direction 625 may then be determined from a cornea-position determined from the second eye-tracking image and the first eye-tracking image that includes the pupil. In particular, the pupil-center coordinate of the first eye-tracking image may be used to assist in determining gaze direction 625, in some embodiments. A vector through an $x_c$, $y_c$, and $z_c$ center of a sphere of the cornea (e.g. cornea-center 515) and an $x_p$, $y_p$, and $z_p$ pupil-center (e.g. pupil-center 415) may assist in generating a gaze direction 625. In some embodiments, gaze direction 625 is slightly offset (e.g. 5 degrees downward) from a vector through pupil-center 415 and cornea-center 515.

In an embodiment, a center-of-rotation 241 of eye 202 is determined from a plurality of prior cornea positions (e.g. calculating the curvature of the sphere of the cornea from cornea glints 551 and calculating a center of that sphere). Then a gaze direction 625 of eye 202 is derived from a vector fit through the center-of-rotation 241 of eye 202 and cornea-center 515. Hence, a gaze direction 625 can initially be determined by fitting a vector through pupil-center 415 and cornea-center 515 and subsequently can be determined by fitting a vector through center-of-rotation 241 and cornea-center 515. Since the initial gaze direction 625 requires a pupil-center 415, the illuminators 436 are driven at a higher intensity to allow for first eye-tracking image 681 to have sufficient contrast to determine the pupil-position 413 and corresponding pupil-center 415. Subsequent gaze directions 625 may be determined from cornea-center coordinate 515 and a center-of-rotation 241 and the cornea-center coordinate 515 can be determined from cornea glints 551 that are resolved from eye-tracking images captured where illuminators 436 emit non-visible illumination light 665 at a lower intensity. Consequently, in a hybrid cornea and pupil tracking technique, significant electrical power savings can be realized from capturing a first eye-tracking image with illuminators 436 emitting a higher intensity of non-visible illumination light 665 and capturing subsequent eye-tracking images at lower intensity of non-visible illumination light 665.

In FIG. 6B, eye 202 has a gaze direction 627 that is in a temple direction, similar to the position of eye 202 in eye-tracking images 462 and 562. Eye-tracking images 685, 686, 687, and 688 may all be captured while illuminators 436 are emitting non-visible illumination light 665 at a lower intensity so that only cornea glints 551 are determined from eye-tracking images 685, 686, 687, and 688. In an embodiment, eye-tracking image 685 is captured at the higher intensity of non-visible illumination light 665 so that a pupil-position 419 may be determined and eye-tracking images 686, 687, and 688 are captured at the lower intensity of non-visible illumination light 665 so that a cornea-position 513 (but not a pupil-position) may be determined. Based on a gaze direction 627 determined from eye-tracking images 685, 686, 687, and 688, a different image 694 may be driven onto display layer 690.

Figure 7:
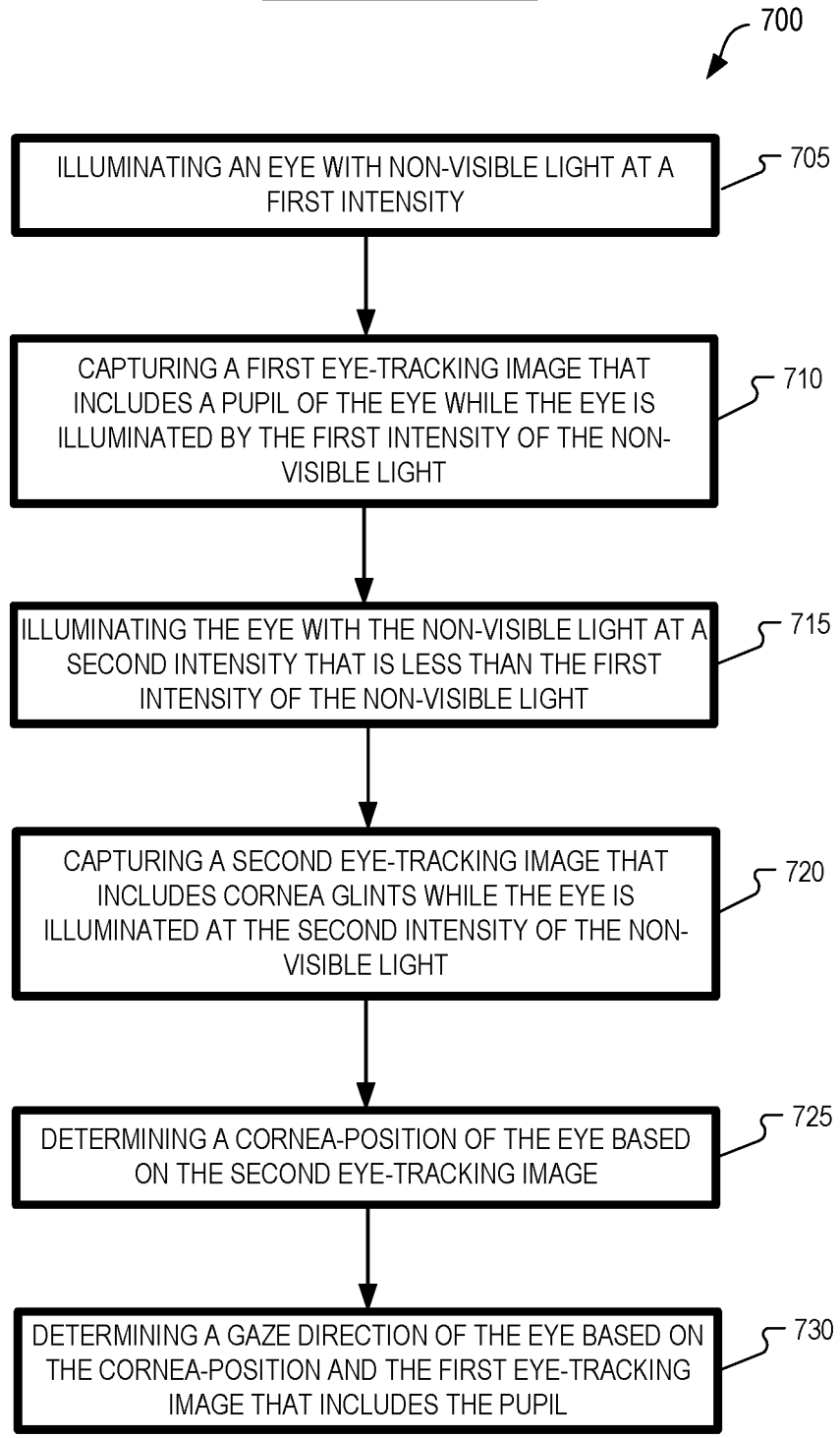
FIG. 7 illustrates a flow chart of an example hybrid cornea and pupil eye-tracking process, in accordance with aspects of the disclosure.

FIG. 7 illustrates a flow chart of an example hybrid cornea and pupil eye-tracking process 700, in accordance with aspects of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, an eye is illuminated with non-visible light (e.g. non-visible illumination light 665) at a first intensity. The non-visible light may be infrared light. The non-visible light may be near-infrared light. The non-visible light may be narrow-band light between 700 nm and 1000 nm, in some embodiments. Illuminating the eye with non-visible light may include illuminating the eye with in-field illuminators of a near-eye optical element where the in-field illuminators are disposed in a field of view (FOV) of the eye. Illuminators 436 may be in-field illuminators, for example.

In process block 710, a first eye-tracking image (e.g. eye-tracking image 681) is captured that includes a pupil of the eye while the eye is illuminated by the first intensity of the non-visible light.

The eye is illuminated with the non-visible light at a second intensity that is less than the first intensity of the non-visible light, in process block 715, In process block 720, a second eye-tracking image (e.g. eye-tracking image 682) is captured that includes cornea glints while the eye is illuminated at the second intensity of the non-visible light that is less than the first intensity.

A cornea-position of the eye is determined based on the second eye-tracking image, in process block 725. The second eye-tracking image may lack sufficient contrast to determine a pupil-position of the eye.

In process block 730, a gaze direction of the eye is determined based on the cornea-position and the first eye-tracking image that includes the pupil. Determining the gaze direction of the eye may include deriving a pupil-center coordinate from the first eye-tracking image.

An embodiment of process 700 further includes detecting a blink event of the eye. The blink event of the eye may be detected by analyzing eye-tracking images captured by a camera (e.g. camera 108 or 650) where the eye-tracking image(s) do not include bright cornea glints because the eyelid has closed over the cornea, for example. The non-visible light may be increased back to the higher first intensity (from the lower second intensity) in response to detecting the blink event of the eye. A subsequent eye-tracking image is captured that includes the pupil while the eye is illuminated by the first intensity of the non-visible light. The increased first intensity provides enough illumination light for a pupil of the eye to be determined from the subsequent eye-tracking image. A subsequent gaze direction of the eye may be determined based on the subsequent eye-tracking image. The subsequent gaze direction is determined subsequent to determining the cornea-position of the eye in process block 725.

Figure 8:
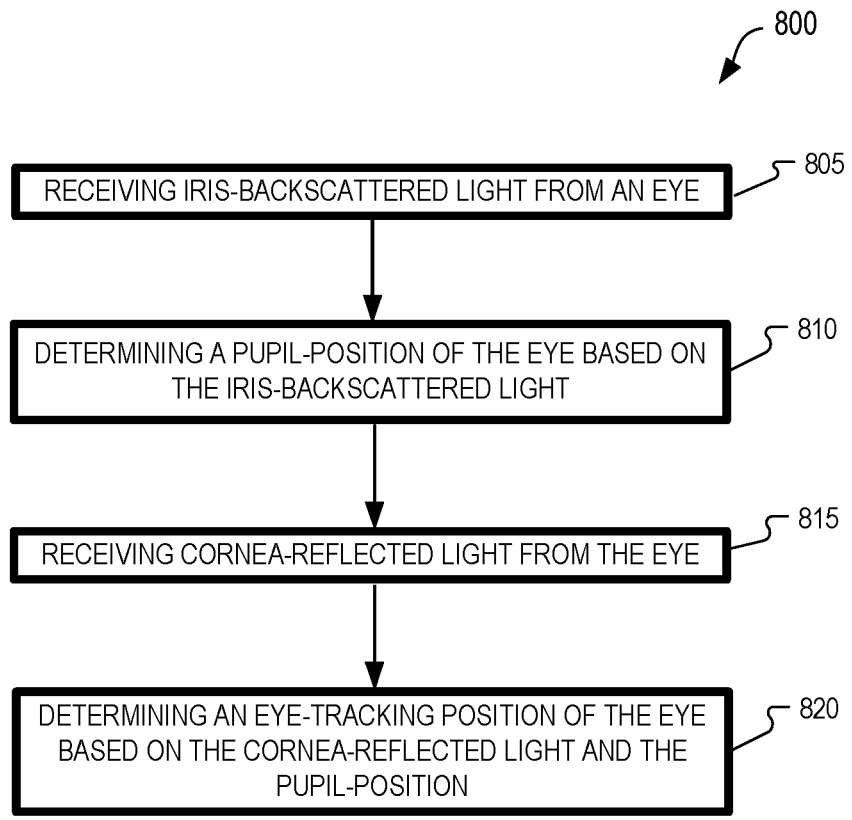
FIG. 8 illustrates a flow chart of an example eye-tracking process, in accordance with aspects of the disclosure.

FIG. 8 illustrates a flow chart of an example eye-tracking process 800, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, iris-backscattered light (e.g. iris-backscattered light 448) is received from an eye.

A pupil-position of the eye is determined based on the iris-backscattered light, in process block 810. Determining the pupil-position of the eye may include deriving a pupil-center coordinate from the iris-backscattered light.

In process block 815, cornea-reflected light (e.g. cornea-reflected light 549) is received from the eye.

An eye-tracking position of the eye is determined based on the cornea-reflected light and the pupil, in process block 820. Determining the eye-tracking position of the eye may include determining a cornea-position of the eye.

In an implementation of process 800, the eye is illuminated with non-visible light and the iris-backscattered light and the cornea-reflected light have a same wavelength as the non-visible light illuminating the eye. The non-visible light may be near-infrared light.

In an implementation, process 800 further includes reducing an output of the non-visible light subsequent to determining the pupil-position. The cornea-reflected light is received while the output of the non-visible light is reduced.

In an implementation, process 800 further includes detecting a blink event of the eye and increasing the output of the non-visible light in response to detecting the blink event of the eye. A subsequent eye-tracking position of the eye is determined based on subsequent iris-backscattered light that is backscattered while the output of the non-visible light is increased. The subsequent eye-tracking position is determined subsequent to determining the pupil-position and the eye-tracking position.

In an implementation, process 800 further includes increasing the output of the non-visible light after a predetermined time period of reduced output of the non-visible light. In one implementation, the predetermined time period is more than one second. In one implementation, the predetermined time period is one second or less. A subsequent eye-tracking position of the eye is determined based on subsequent iris-backscattered light that is backscattered while the output of the non-visible light is increased. The subsequent eye-tracking position is determined subsequent to determining the pupil-position and the eye-tracking position.

In an implementation, process 800 further includes determining a gaze direction of the eye based at least in part on the eye-tracking position and the pupil-position.

In some implementations, a pupil-position of the eye is an absolute position of the eye that is updated with relative positions of the eye determined from the cornea-reflected light (having the lower intensity). While combining cornea tracking and pupil tracking can be more electrically efficient, the combination of using cornea and pupil tracking can also yield more accurate results for determining an eye-tracking position since the results of both systems can be checked against each other for errors and accuracy.

Figure 9A:
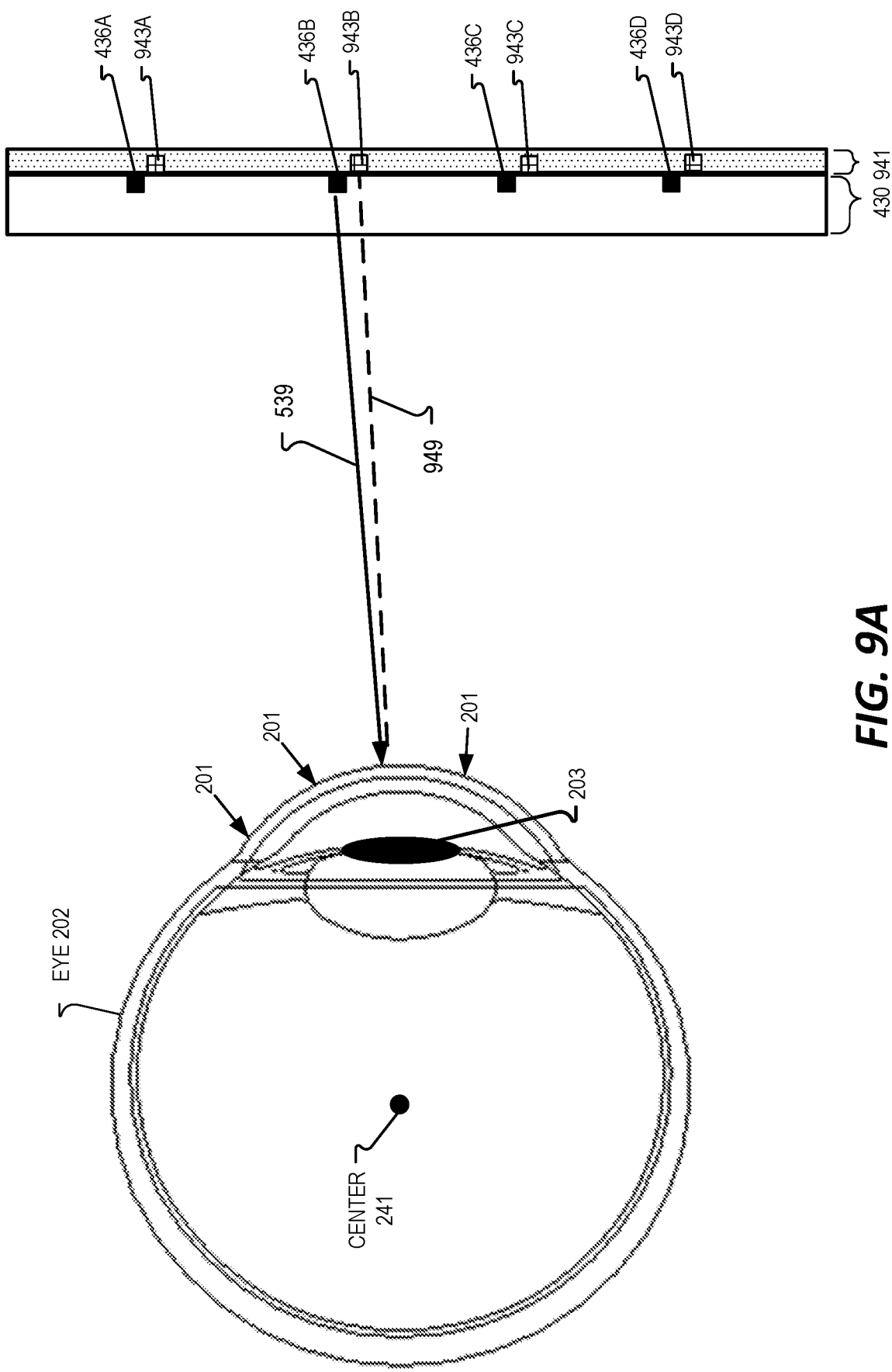
FIGS. 9A and 9B illustrate an example sensing layer including angle-sensitive photodiodes for sensing cornea glints, in accordance with aspects of the disclosure.
Figure 9B:
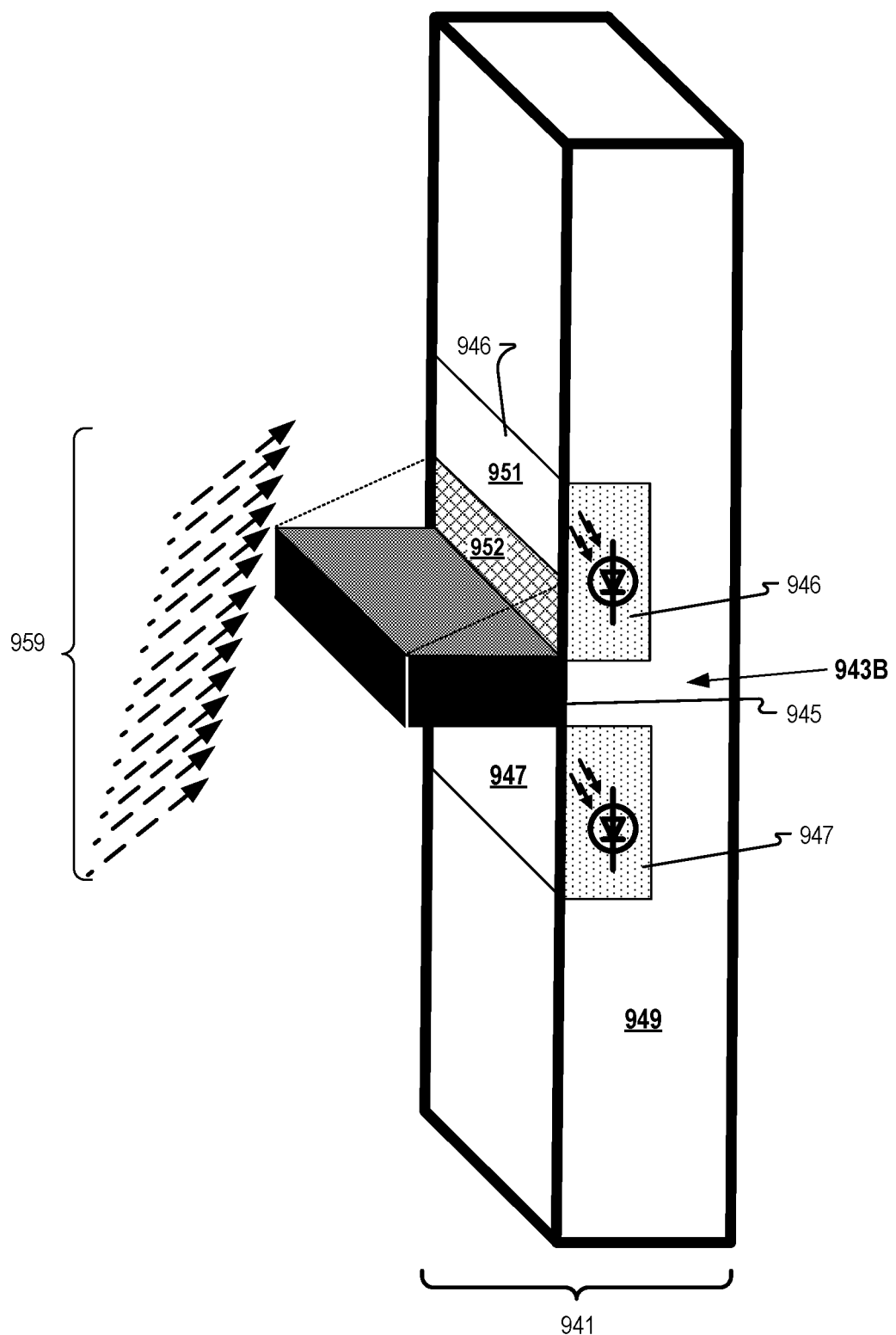

FIGS. 9A and 9B illustrate an example sensing layer including angle-sensitive photodiodes for sensing cornea glints, in accordance with aspects of the disclosure. FIG. 9A illustrates illuminator 436B emitting non-visible illumination light 539 toward eye 202. Sensing layer 941 includes a plurality of angle-sensitive photodiodes 943A, 943B, 943C, and 943D configured to receive cornea-reflected light. In the particular example of FIG. 9A, angle-sensitive photodiode 943B receive cornea-reflected light 949 that is a reflection of non-visible illumination light 539 from cornea 201.

FIG. 9B illustrates an example configuration of an angle-sensitive photodiode 943B within a substrate 949. In FIG. 9B, photodiodes 946 and 947 are disposed on opposite sides of a wall 945. When incoming light is incident orthogonal to a common receiving plane of photodiodes 946 and 947, each photodiode generates the same electrical signal (e.g. same current value). Yet, FIG. 9B shows that when cornea-reflected light 949 is incident at an angle, wall 945 creates a shadow region 952 of photodiode 946 that will not receive cornea-reflected light 949 even while an illuminated region 951 of photodiode 946 is illuminated by cornea-reflected light 949. Consequently, photodiode 946 will generate a smaller electrical signal than photodiode 947 that is fully illuminated by cornea-reflected light 949. In this way, an angle of incident light can be determined from a ratio of electrical signals generated by two photodiodes and a wall/baffle 945. In some embodiments, more than two photodiodes and more than one wall may be used to determine an incident angle of cornea-reflected light 949. In some embodiments, an angle-sensitive photodiode has a corresponding illuminator 436. One or more angle-sensitive photodiodes may be used to sense a position of a particular cornea glint based on an incident angle of cornea-reflected light 949. In some embodiments, a filter is placed over photodiode 946 and 947 so that only the wavelength of non-visible light 539 (having the same wavelength as cornea-reflected light 949) is received by photodiodes 946 and 947.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 670) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
    illuminating an eye with non-visible light at a first intensity;
    capturing a first eye-tracking image that includes a pupil of the eye while the eye is illuminated by the first intensity of the non-visible light;
    illuminating the eye with the non-visible light at a second intensity that is less than the first intensity of the non-visible light;
    capturing a second eye-tracking image that includes cornea glints while the eye is illuminated at the second intensity of the non-visible light that is less than the first intensity;
    determining a cornea-position of the eye based on the second eye-tracking image;
    determining a gaze direction of the eye based on the cornea-position and the first eye-tracking image that includes the pupil;
    detecting a blink event of the eye;
    increasing the non-visible light to the first intensity from the second intensity in response to detecting the blink event of the eye;
    capturing a subsequent eye-tracking image of the pupil while the eye is illuminated by the first intensity of the non-visible light; and
    determining a subsequent gaze direction of the eye based on the subsequent eye-tracking image, wherein the subsequent gaze direction is determined subsequent to determining the cornea-position of the eye.

2. The method of claim 1, wherein the second eye-tracking image lacks sufficient contrast to determine a pupil-position of the eye.

3. The method of claim 1, wherein determining the gaze direction of the eye includes deriving a pupil-center coordinate from the first eye-tracking image.

4. The method of claim 1, wherein the non-visible light is near-infrared light.

5. The method of claim 1, wherein illuminating the eye with non-visible light includes illuminating the eye with in-field illuminators of a near-eye optical element, and wherein the in-field illuminators are disposed in a field of view (FOV) of the eye.

6. A near-eye optical system comprising:
    an infrared light source configured to illuminate an eye with infrared light;
    a camera configured to capture images of the eye, wherein the camera is configured to receive a wavelength that matches the infrared light emitted by the infrared light source and reject other light, and wherein the near-eye optical system is configured to:
        drive the infrared light source to illuminate the eye with the infrared light at a first intensity;
        capture, with the camera, a first eye-tracking image that includes a pupil of the eye while the eye is illuminated by the first intensity of infrared light;

drive the infrared light source to illuminate the eye with the infrared light at a second intensity that is less than the first intensity;

capture cornea glints while the eye is illuminated at the second intensity that is less than the first intensity;

determine a cornea-position of the eye based on the captured cornea glints;

determine a gaze direction of the eye based on the cornea-position and the first eye-tracking image that includes the pupil;

detecting a blink event of the eye;

increasing the infrared light to the first intensity from the second intensity in response to detecting the blink event of the eye;

capturing a subsequent eye-tracking image of the pupil while the eye is illuminated by the first intensity of the infrared light; and determining a subsequent gaze direction of the eye based on the subsequent eye-tracking image, wherein the subsequent gaze direction is determined subsequent to determining the cornea-position of the eye.

7. The near-eye optical system of claim 6, wherein determining the gaze direction of the eye includes deriving a pupil-center coordinate from the first eye-tracking image.

8. The near-eye optical system of claim 6, wherein the infrared light source is an in-field illuminator of a near-eye optical element, and wherein the in-field illuminator is disposed in a field of view (FOV) of the eye.

9. The near-eye optical system of claim 6, wherein the first intensity is more than ten times greater than the second intensity.

10. The near-eye optical system of claim 6, wherein the infrared light is near-infrared light.

11. The near-eye optical system of claim 6 further comprising angle-sensitive photodiodes for capturing the cornea glints.

12. The method of claim 1, wherein the gaze direction of the eye is further based on a cornea-center of the cornea-position and a vector through the cornea-center and a pupil-center of the pupil.

13. The near-eye optical system of claim 6, wherein the gaze direction of the eye is further based on a cornea-center of the cornea-position and a vector through the cornea-center and a pupil-center of the pupil.

* * * * *